(12) United States Patent
Kim

(10) Patent No.: US 11,498,407 B2
(45) Date of Patent: Nov. 15, 2022

(54) STRUCTURE FOR CONNECTING ENGINE TO HYBRID TRANSMISSION

(71) Applicant: Hyundai Transys Inc., Seosan-si (KR)

(72) Inventor: Tae Hoon Kim, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 130 days.

(21) Appl. No.: 17/113,788

(22) Filed: Dec. 7, 2020

(65) Prior Publication Data
US 2022/0001737 A1  Jan. 6, 2022

(30) Foreign Application Priority Data
Jul. 6, 2020 (KR) .................. 10-2020-0083010

(51) Int. Cl.
| | |
|---|---|
| *B60K 6/40* | (2007.10) |
| *B60K 6/405* | (2007.10) |
| *B60K 6/36* | (2007.10) |
| *B60K 6/24* | (2007.10) |
| *F16D 1/06* | (2006.01) |

(52) U.S. Cl.
CPC .................. *B60K 6/40* (2013.01); *B60K 6/24* (2013.01); *B60K 6/36* (2013.01); *B60K 6/405* (2013.01); *F16D 2001/062* (2013.01)

(58) Field of Classification Search
CPC .. B60K 6/405; B60K 6/40; B60K 2006/4825; B60K 6/48; B60K 6/36; B60K 6/54; B60K 6/24; F16D 2001/062; F16D 1/076; F16D 3/79
See application file for complete search history.

(56) References Cited

U.S. PATENT DOCUMENTS

| | | | |
|---|---|---|---|
| 7,954,578 B2 | 6/2011 | Kim et al. | |
| 2009/0062052 A1* | 3/2009 | Kim | ........................ B60K 6/48 903/952 |
| 2017/0050506 A1* | 2/2017 | Trinkenschuh | ......... F16D 13/52 |

FOREIGN PATENT DOCUMENTS

KR    10-2009-0020791 A    2/2009

* cited by examiner

*Primary Examiner* — David J Hlavka
(74) *Attorney, Agent, or Firm* — Novick, Kim & Lee PLLC; Jae Youn Kim

(57) ABSTRACT

Provided is a structure for connecting an engine to a hybrid transmission, the structure including: a connecting unit connected to a rotor shaft at the opposite side and having an edge portion connected to a mass body by a connecting plate; and a drive plate positioned at a side close to a crank shaft so as to be opposite to the connecting unit, the drive plate being configured to connect the mass body and the crank shaft.

8 Claims, 7 Drawing Sheets

STRUCTURE FOR CONNECTING ENGINE TO HYBRID TRANSMISSION

CROSS-REFERENCE TO RELATED APPLICATIONS

This application claims priority to and the benefit of Korean Patent Application No. 10-2020-0083010 filed in the Korean Intellectual Property Office on Jul. 6, 2020, the entire contents of which are incorporated herein by reference.

TECHNICAL FIELD

The present invention relates to a structure for connecting an engine to a hybrid transmission.

BACKGROUND ART

In general, a hybrid vehicle refers to a vehicle driven by an efficient combination of two or more different types of power sources. The hybrid vehicle refers to a vehicle driven by an engine which obtains rotational force by combusting fuel (fossil fuel such as gasoline), and a motor which obtains rotational force from electric power of a battery.

Research is being actively conducted on the hybrid vehicle as a future vehicle capable of reducing exhaust gas and improving fuel economy by adopting the motor as an auxiliary power source as well as the engine.

The hybrid vehicle typically uses the engine and the motor. The hybrid vehicle uses the motor, as a main power source, which has relatively good low-speed torque characteristics, at a low speed, and uses the engine, as a main power source, which has relatively good high-speed torque characteristics, at a high speed. Therefore, in a low-speed section, the hybrid vehicle uses the motor while stopping the operation of the engine that uses fossil fuel, and thus the hybrid vehicle has an excellent effect of improving fuel economy and reducing exhaust gas.

A drive device for a hybrid vehicle allows the hybrid vehicle to travel in an electric vehicle (EV) mode which is a pure electric vehicle mode in which only the rotational force of the motor is used to drive the hybrid vehicle, or in an operation mode such as a hybrid electric vehicle (HEV) mode in which the rotational force of the motor is used as auxiliary power while the rotational force of the engine is used as main power. The mode is switched from the EV mode to the HEV mode by starting the engine.

A hybrid system in the related art may have inexpensive components in comparison with a high-voltage system and may implement an output at a level corresponding to a full hybrid level within a short time by a combination of two or more motors. The hybrid system in the related art is generally classified into P0, P1, P2, P3, and P4 depending on the positions of the motor, and the respective systems have differences according to whether the EV mode is implemented, regenerative braking performance, and the like.

FIG. 1 is a view illustrating a hybrid transmission in the related art. As illustrated in FIG. 1, a P1-P2 hybrid transmission in the related art includes a P1 motor 1 including a stator 1a and a rotor 1b, a P2 motor 2 including a stator 2a and a rotor 2b, and a torsional damper 3 provided between the P1 motor 1 and the P2 motor 2. The torsional damper 3 is connected to the rotor 1a of the P1 motor 1. A rotor shaft 1c of the P1 motor 1 and a connecting shaft 4 of an engine are connected with splines S.

However, for the purpose of smooth assembly, there is backlash between the rotor shaft of the P1 motor and the splines of the connecting shaft of the P1-P2 hybrid transmission in the related art. Because of the backlash, gaps are present between surfaces of teeth of the connecting shaft, which causes rattling noise while power is transmitted from the engine.

Accordingly, the present invention is intended to provide a mechanism capable of connecting the connecting shaft of the engine without a gap.

DOCUMENT OF RELATED ART

Patent Document (Patent Document 1) Korean Patent Application Laid-Open No. 10-2009-0020791 (published on Feb. 27, 2009)

SUMMARY OF THE INVENTION

The present invention has been made in an effort to provide a structure for connecting an engine to a hybrid transmission, the structure being capable of connecting a connecting shaft of an engine without a gap.

An exemplary embodiment of the present invention provides a structure for connecting an engine to a hybrid transmission, the structure including: a connecting unit connected to a rotor shaft at the opposite side and having an edge portion connected to a mass body by a connecting plate; and a drive plate positioned at a side close to a crank shaft so as to be opposite to the connecting unit, the drive plate being configured to connect the mass body and the crank shaft.

The connecting unit may be a flange, and one surface of the flange may be connected to one surface of the rotor shaft.

A bolt hole may be provided in one surface of the flange along a pitch circle that forms a concentric circle with a center of one surface of the flange, and in which the flange and the rotor shaft may be connected by a bolt coupled to the bolt hole.

Splines may be provided on one surface of the flange at the periphery of the bolt hole.

Splines, which correspond to the splines of the flange, may be provided on one surface of the rotor shaft.

The crank shaft and a boss provided at a center of the drive plate may be connected by a bolt, and the edge portion of the drive plate and the mass body may be connected by a bolt.

A housing partition wall may be provided between a motor, the mass body, and the connecting plate, a hub may be provided at a center of the housing partition wall so as to surround the rotor shaft, and an oil seal for providing fluid tightness may be provided between an outer diameter of the rotor shaft and an inner diameter of the hub.

The connecting unit may be a first connecting shaft, the first connecting shaft may include: a first extension portion connected to the rotor shaft by means of splines while penetrating the inside of the rotor shaft; and a second extension portion extending in a direction from the first extension portion to the crank shaft and inserted into the crank shaft, and a locking nut, which is thread-coupled to an exposed portion of the first extension portion which passes the inside of the rotor shaft and is exposed to the outside, may be in close contact with an opposite surface of the rotor shaft, such that the first connecting shaft is locked.

The connecting unit may be a second connecting shaft, the second connecting shaft may be inserted into the rotor shaft and connected to the rotor shaft by means of splines, a bolt may be thread coupled to an end surface of the second connecting shaft, and a locking plate coupled to the bolt may be inserted into a first insertion portion provided on an opposite surface of the rotor shaft and simultaneously comes into close contact with the opposite surfaces of the rotor shaft and the second connecting shaft, such that second connecting shaft is locked, and an O-ring, which is pressed against the locking plate, may provide fluid tightness between the portion where the end surfaces of the rotor shaft and the second connecting shaft are connected by means of the splines.

The connecting unit may be a connecting nut, the connecting nut may be connected to an outer diameter of the rotor shaft by means of splines, and when a bolt is coupled to the opposite surface of the rotor shaft, the locking plate coupled to the bolt may be inserted into a second insertion portion provided on an opposite surface of the connecting nut, and the rotor shaft and the opposite surface of the connecting nut simultaneously come into close contact with each other, such that a connecting nut is locked.

The structure according to the present invention may connect the rotor of the hybrid transmission and the connecting shaft of the engine without a gap.

The structure according to the present invention may prevent rattling noise by eliminating gaps between the surface of the teeth of the connecting shaft of the engine.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
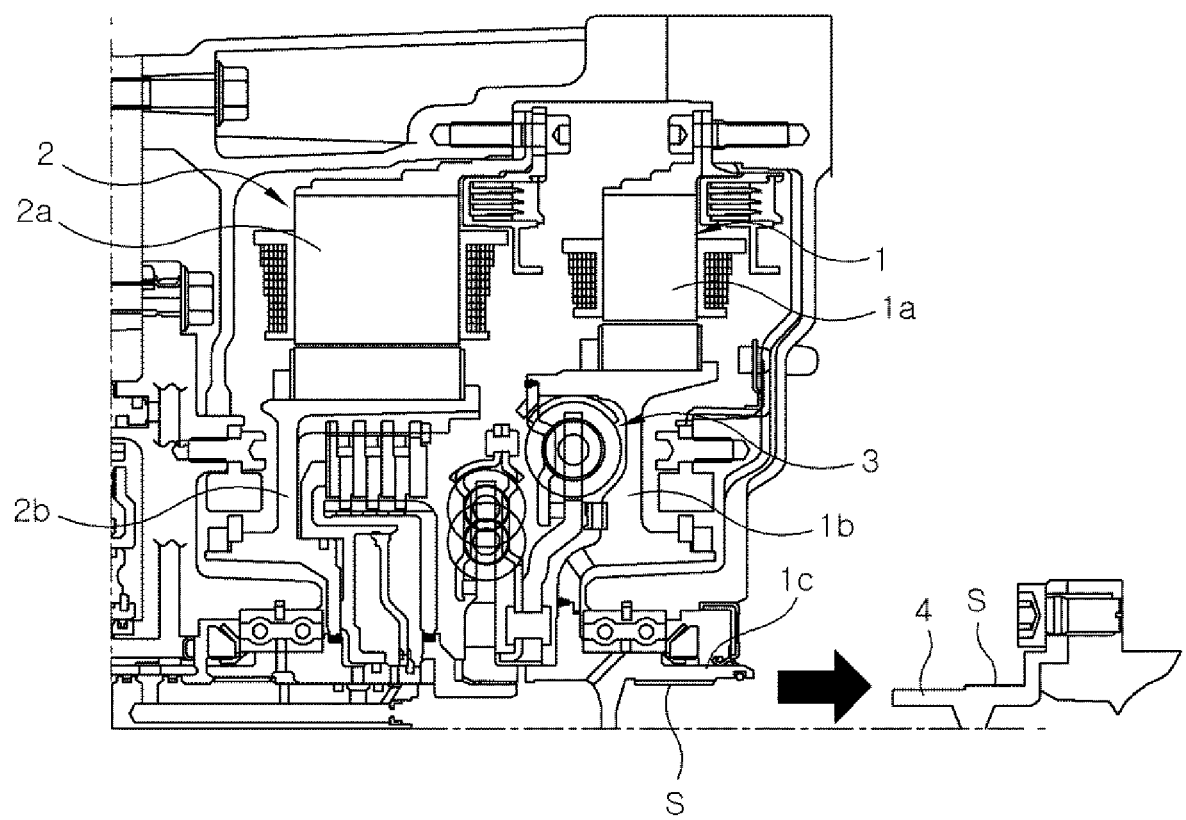
FIG. 1 is a view illustrating a hybrid transmission in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly-known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

For the purpose of smooth assembly, there is backlash between the rotor shaft of the P1 motor and the splines of the connecting shaft of the P1-P2 hybrid transmission in the related art. Because of the backlash, gaps are present between surfaces of teeth of the connecting shaft, which causes rattling noise while power is transmitted from the engine. Accordingly, the present invention is intended to provide a mechanism capable of connecting the connecting shaft of the engine without a gap.

First, a structure for connecting an engine to a hybrid transmission according to a first exemplary embodiment of the present invention will be described.

Figure 2:
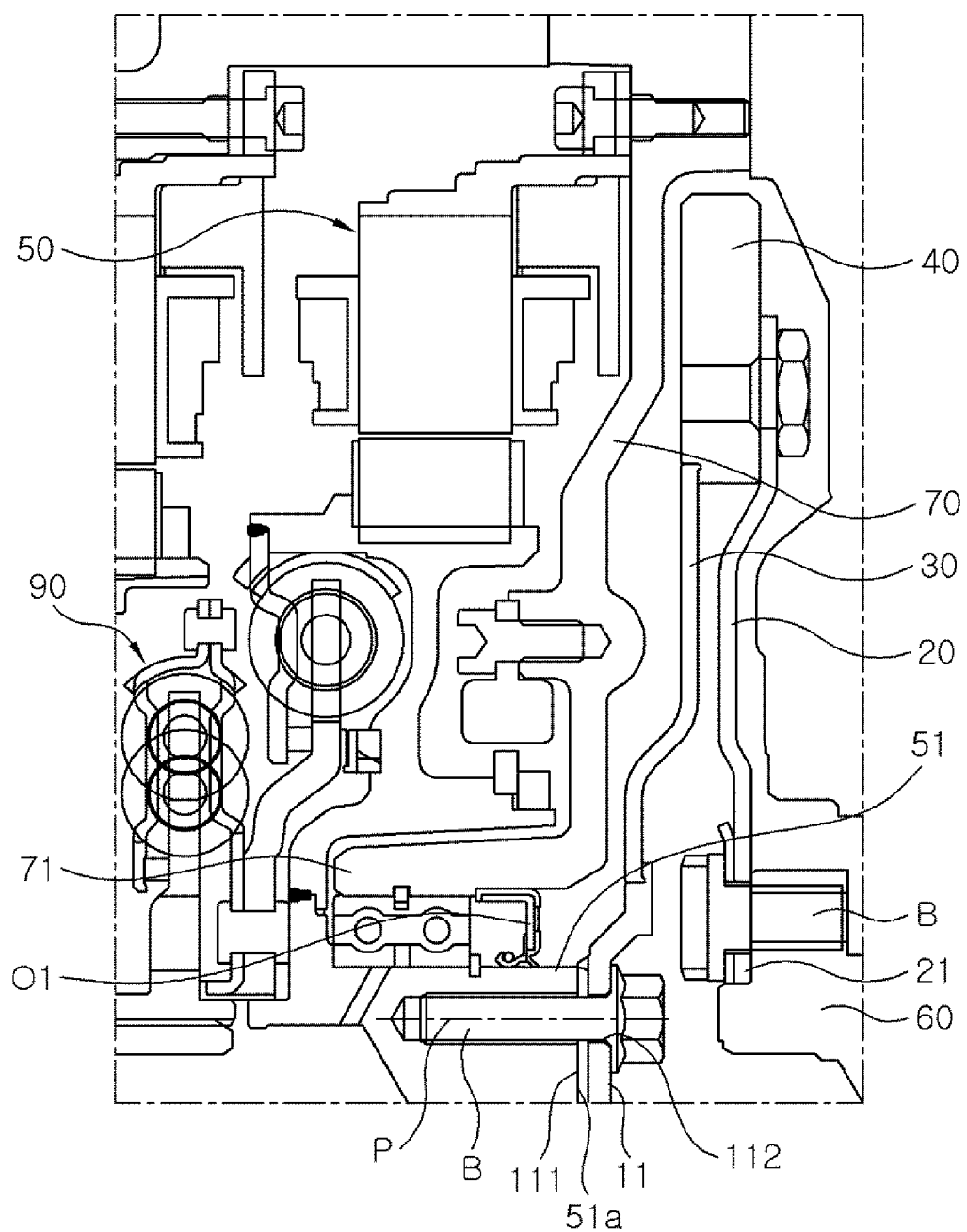
FIG. 2 is a view illustrating a structure for connecting an engine to a hybrid transmission according to a first exemplary embodiment of the present invention.
Figure 3:
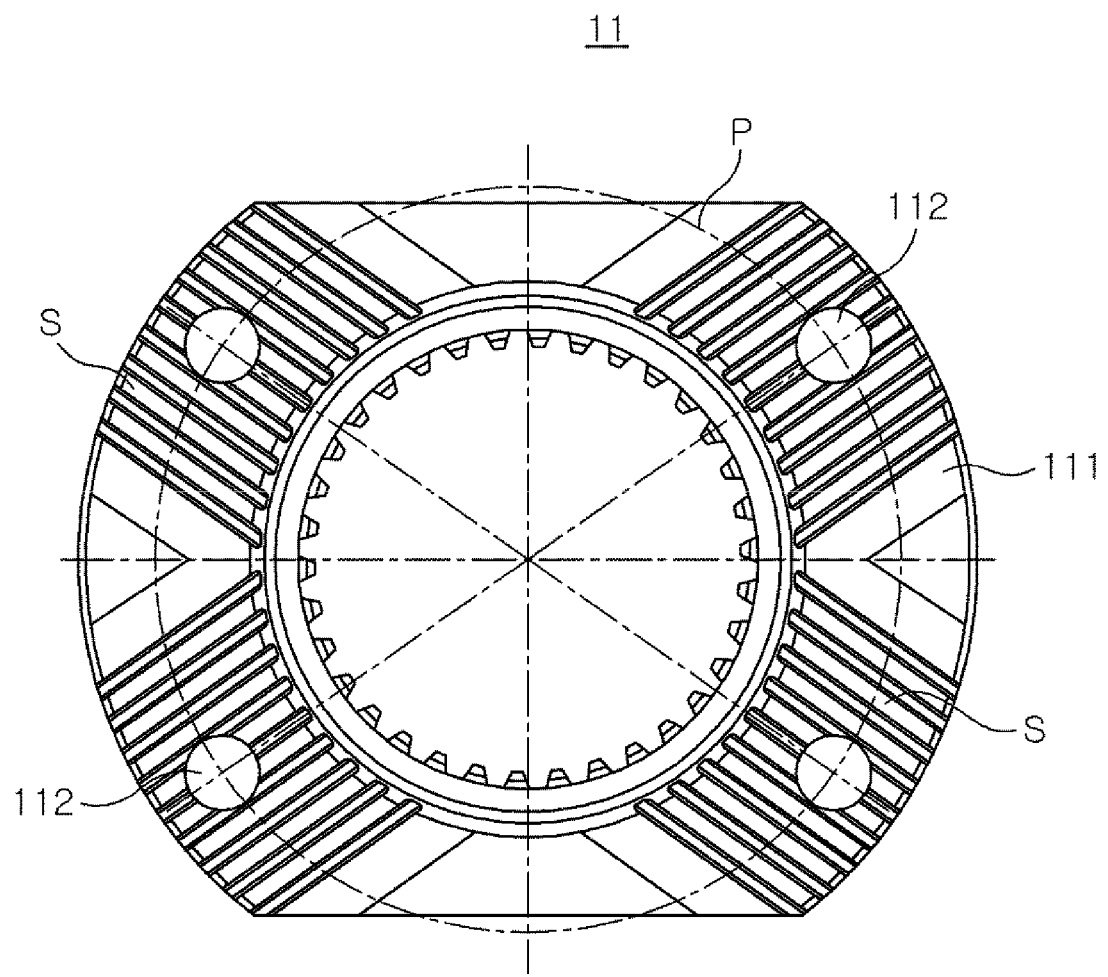
FIG. 3 is an enlarged view of a flange according to the first exemplary embodiment of the present invention.

FIG. 2 is a view illustrating the structure for connecting an engine to a hybrid transmission according to the first exemplary embodiment of the present invention, and FIG. 3 is an enlarged view of a flange according to the first exemplary embodiment of the present invention.

The first exemplary embodiment of the present invention includes a connecting unit connected to a rotor shaft 51 of a motor 50 and having an edge connected to a mass body 40, and a drive plate 20 configured to connect the mass body 40 and a crank shaft 60 of an engine.

In the first exemplary embodiment of the present invention, the connecting unit connected to the rotor shaft 51 is a flange 11. One surface 111 of the flange 11 is connected to one surface 51a of the rotor shaft 51 at the opposite side.

The flange 11 is connected to the mass body 40 with a connecting plate 30. Specifically, the connecting plate 30 is connected to the flange 11 so that the flange 11 is positioned at a center of the connecting plate 30. An edge portion of the connecting plate 30 is connected to the mass body 40.

The mass body is a weight member. When the flange 11 rotates together with the rotor shaft 51, rotational inertia is additionally applied by a weight of the mass body 40, such that vibration caused by the rotation may be reduced.

A bolt hole 112 is provided in the one surface 111 of the flange 11. The bolt hole 112 is provided along a pitch circle P that forms a concentric circle with a center of one surface 111 of the flange 11. During an assembly process, a bolt B is coupled to the bolt hole 112 to connect the flange 11 and the rotor shaft 51.

For example, splines S may be provided on one surface 111 of the flange 11. The splines S may be provided in a region of one surface 111 of the flange 11 at the periphery of the bolt hole 112.

Although not illustrated in the drawings, splines, which correspond to the splines S of the flange 11, may also be provided on one surface of the rotor shaft 51. One surface 111 of the flange 11 and one surface 51a of the rotor shaft 51 may be securely coupled by being connected with the splines S.

The drive plate 20 is positioned at a side close to the crank shaft 60 and spaced apart from the flange 11 at a predetermined interval. A boss 21 is provided at a center of the drive plate 20. During the assembly process, a bolt B is fastened to the boss 21 and the crank shaft 60 in a state in which the crank shaft 60 is coupled to a center of the boss 21 provided on the drive plate 20.

An edge portion of the drive plate 20 is connected to the mass body 40. The bolt B is fastened to the pitch circle P of the drive plate 20 to securely connect the drive plate 20 and the mass body 40.

A housing partition wall 70 is provided between the motor 50 and the connection structure of the mass body 40 and the connecting plate 30. A hub 71 is provided at a center of the housing partition wall 70. The housing partition wall 70 is assembled so that the hub 71 surrounds the rotor shaft 51.

An oil seal O1 is provided between an outer diameter of the rotor shaft 51 and an inner diameter of the hub 71. Fluid tightness may be provided between the outer diameter of the rotor shaft 51 and the inner diameter of the hub 71 by the oil seal O1.

Next, the process of assembling the structure for connecting an engine to a hybrid transmission according to the first exemplary embodiment of the present invention will be described.

Figure 4:
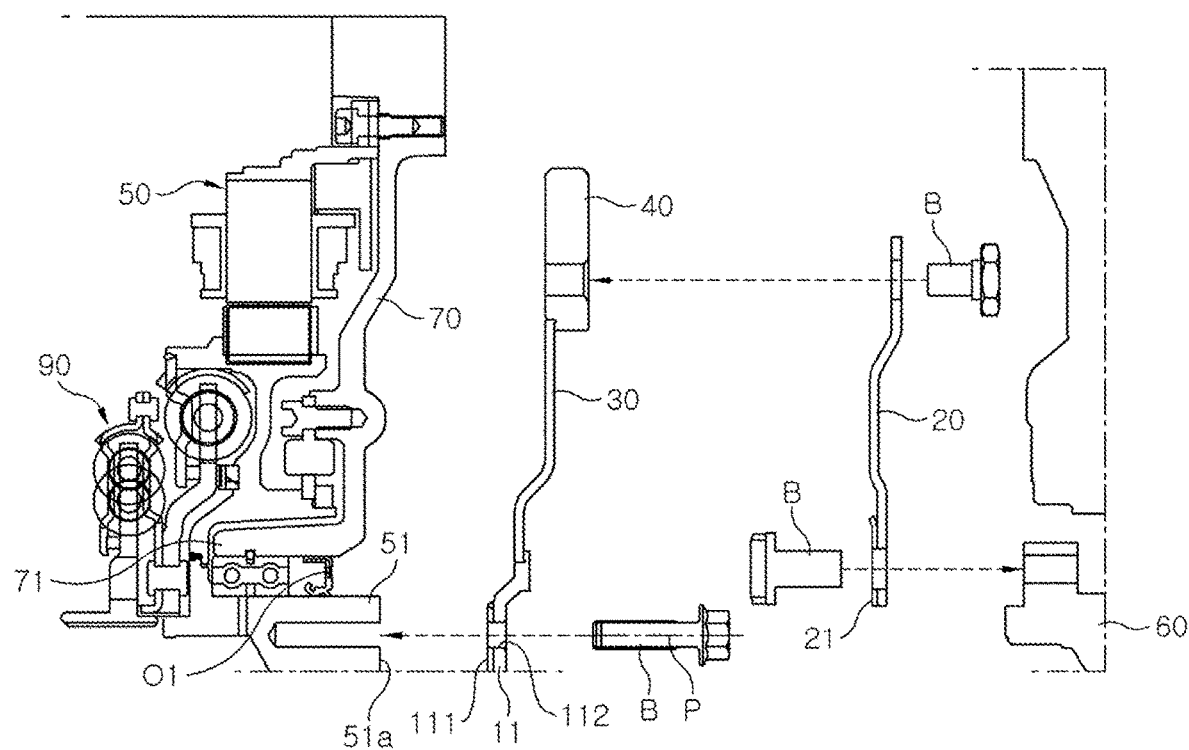
FIG. 4 is a view illustrating a process of assembling a drive plate and the flange according to the first exemplary embodiment of the present invention.

FIG. 4 is a view illustrating the process of assembling the drive plate and the flange according to the first exemplary embodiment of the present invention.

First, the flange 11 is coupled to the transmission side. Specifically, one surface 51a of the rotor shaft 51 mounted on the transmission is brought into close contact with one surface 111 of the flange 11. In this state, the bolt B is fastened through the bolt hole 112 provided in one surface 111 of the flange 11, such that the rotor shaft 51 and the flange 11 are assembled.

After the rotor shaft 51 and the flange 11 are assembled, the drive plate 20 is assembled to the engine side. Specifically, the bolt B is fastened to the boss 21 in the state in which the boss 21 of the drive plate 20 is positioned on the crank shaft 60, such that the drive plate 20 and the crank shaft 60 are assembled.

In the state in which the edge portion of the drive plate 20 is in close contact with the mass body 40 after the drive plate 20 and the crank shaft 60 are completely assembled, the bolt B is fastened to the edge portion of the drive plate 20, such that the drive plate 20 and the mass body 40 are assembled.

Specifically, because the bolt holes, to which the bolt B may be fastened, are formed in the drive plate 20 and the pitch circle P of the mass body 40, the assembly process may be easily performed.

As described above, the process of assembling the flange 11 and the drive plate 20 are separately performed at the transmission side and the engine side opposite to the transmission side, and as a result, the assembly process may be quickly performed without interference between the flange 11 and the drive plate 20 during the assembly process.

The torsional damper is a device installed between the engine and the transmission and configured to reduce torsional vibration periodically generated on an input shaft during the process of transmitting power. The torsional damper 90 is connected to the rotor of the motor 50.

Next, a structure for connecting an engine to a hybrid transmission according to a second exemplary embodiment of the present invention will be described.

Figure 5:
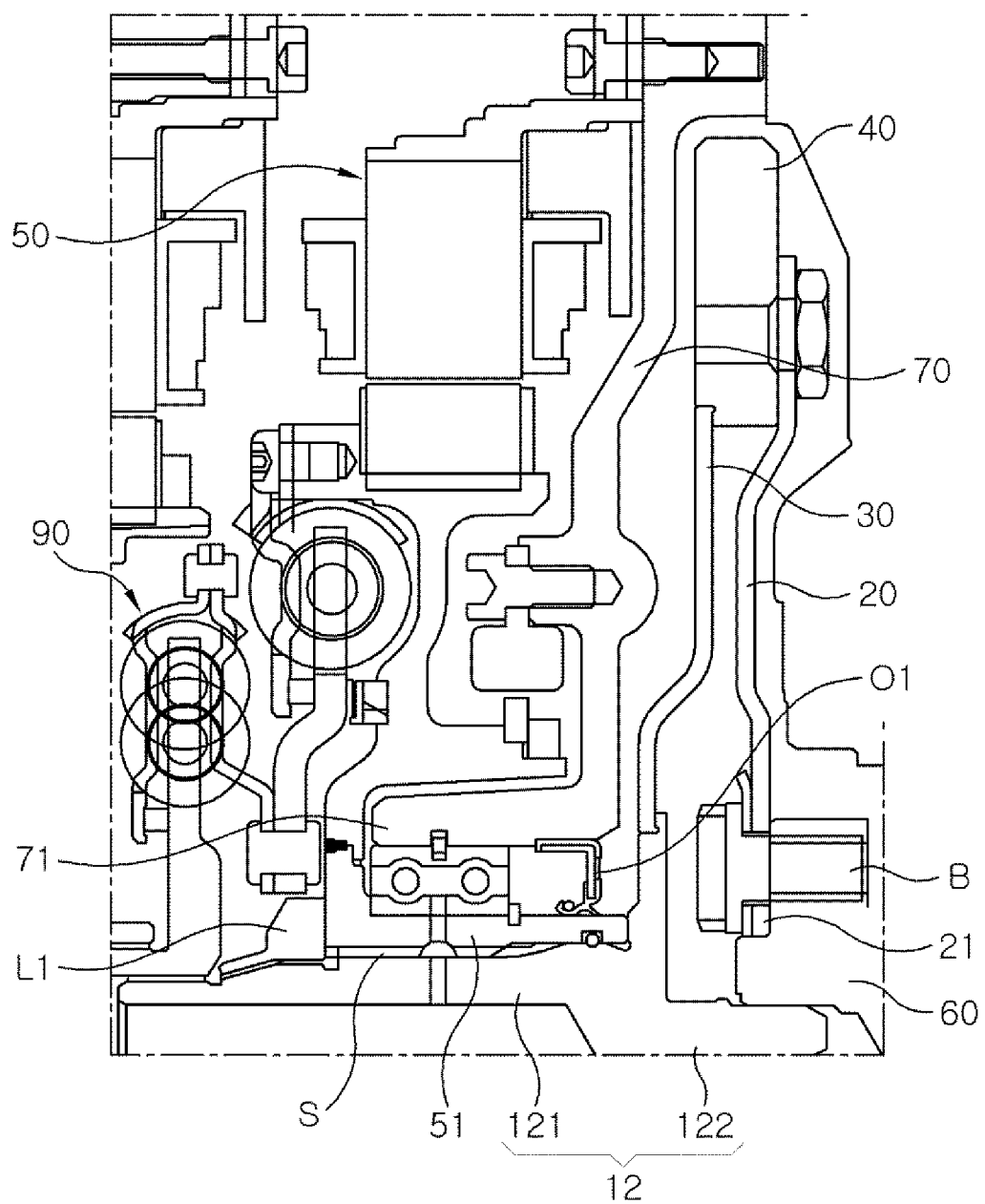
FIG. 5 is a view illustrating a structure for connecting an engine to a hybrid transmission according to a second exemplary embodiment of the present invention.

FIG. 5 is a view illustrating the structure for connecting an engine to a hybrid transmission according to the second exemplary embodiment of the present invention.

Except for the connecting unit and components for assembling the rotor shaft corresponding to the connecting unit, the other components of the second exemplary embodiment of the present invention are identical to those of the first exemplary embodiment.

In the second exemplary embodiment of the present invention, the connecting unit is a first connecting shaft 12. The first connecting shaft 12 includes a first extension portion 121 extending in a direction of the motor 50, and a second extension portion 122 extending in a direction of the crank shaft 60.

The first extension portion 121 is inserted into the rotor shaft 51 and connected by means of splines. In this case, a locking nut L1 is thread-coupled to an exposed portion of the first extension portion 121 which passes the inside of the rotor shaft 51 and is exposed to the outside.

The locking nut L1 is in close contact with an opposite surface of the rotor shaft. The first extension portion 121 cannot be withdrawn from the rotor shaft 51 by the locking nut L1. The first connecting shaft 12 is locked by the locking nut L1 thread-coupled to the exposed portion of the first extension portion 121.

The second extension portion 122 extends from the first extension portion 121 toward the crank shaft 60. The second extension portion 122 is inserted into the crank shaft 60.

Next, a structure for connecting an engine to a hybrid transmission according to a third exemplary embodiment of the present invention will be described.

Figure 6:
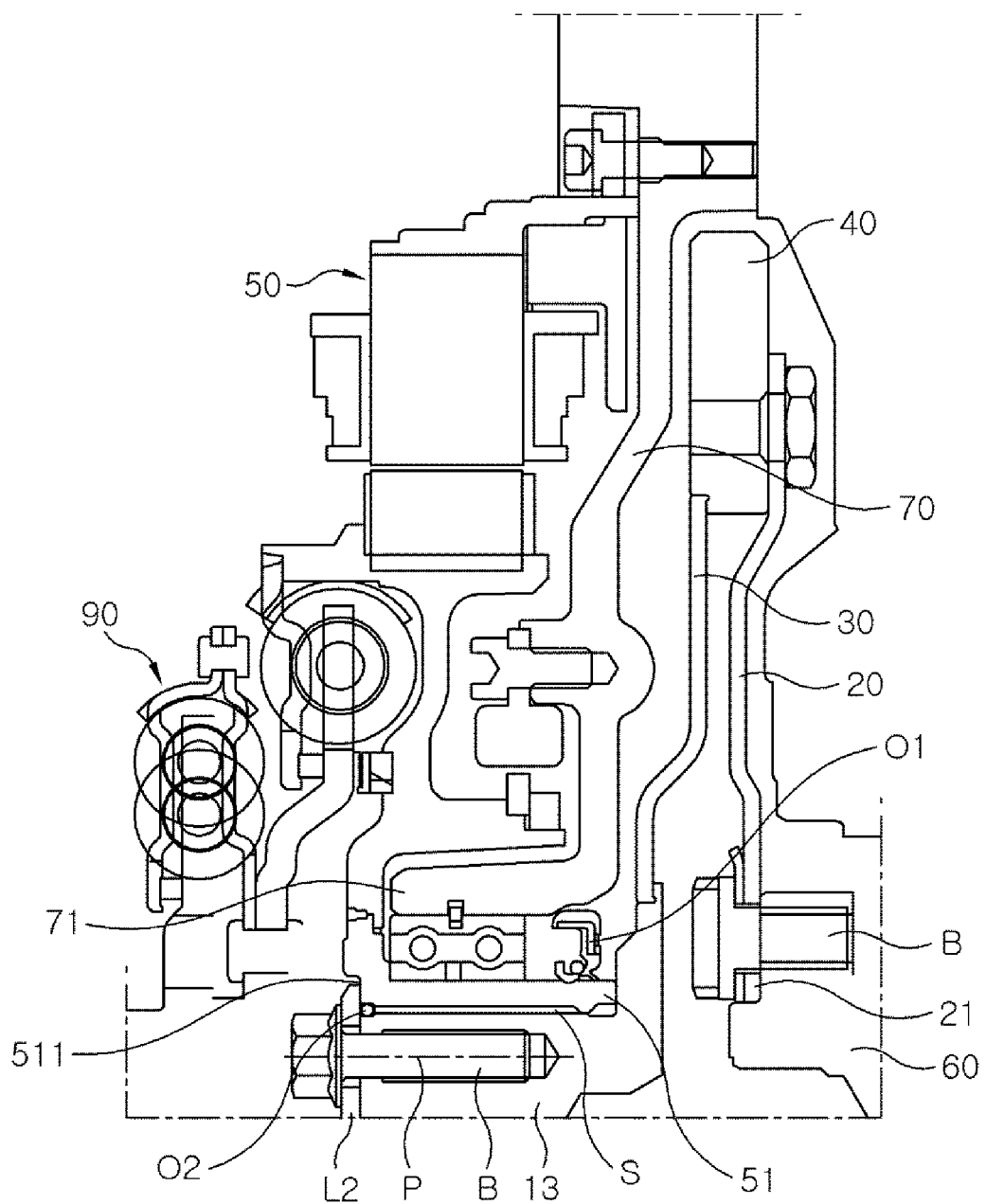
FIG. 6 is a view illustrating a structure for connecting an engine to a hybrid transmission according to a third exemplary embodiment of the present invention.

FIG. 6 is a view illustrating the structure for connecting an engine to a hybrid transmission according to the third exemplary embodiment of the present invention.

Except for the connecting unit and components for assembling the rotor shaft corresponding to the connecting unit, the third exemplary embodiment of the present invention is identical to the first exemplary embodiment.

In the third exemplary embodiment of the present invention, the connecting unit is a second connecting shaft 13. The second connecting shaft 13 is inserted into the rotor shaft 51 and connected to the rotor shaft 51 by means of the splines S. The bolt B is coupled to an end surface directed toward the torsional damper 90 of the second connecting shaft 13. During the assembly process, an end surface of the rotor shaft 51 directed toward the torsional damper 90 and an end surface of the second connecting shaft 13 toward the torsional damper 90 form the same plane.

When the bolt B is coupled to the second connecting shaft 13, a locking plate L2 coupled to the bolt B is inserted into the first insertion portion 511 provided in an opposite surface of the rotor shaft 51.

Specifically, the locking plate L2 is inserted into the first insertion portion 511 and is in close contact with the end surfaces of the second connecting shaft 13 and the rotor shaft 51, such that the second connecting shaft 13 is in a locked state in which the second connecting shaft 13 cannot be separated from the rotor shaft 51.

An O-ring O2 is provided on a portion where the end surfaces of the second connecting shaft 13 and the rotor shaft 51 are connected with the splines S. The O-ring O2 is pressed by the locking plate L2. The O-ring O2 may provide fluid tightness at the portion where the end surfaces of the second connecting shaft 13 and the rotor shaft 51 are connected by means of the splines S.

Next, a structure for connecting an engine to a hybrid transmission according to a fourth exemplary embodiment of the present invention will be described.

Figure 7:
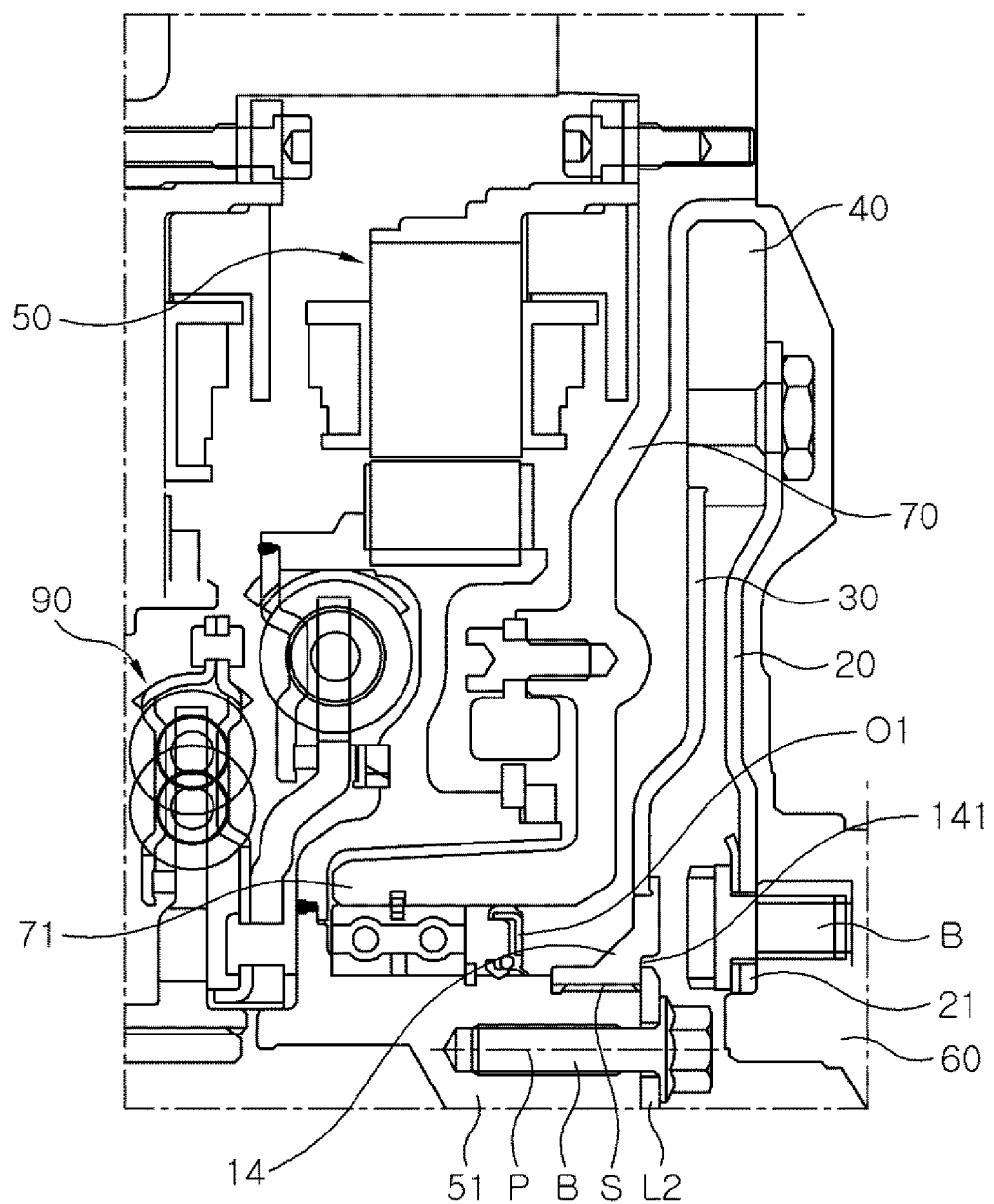
FIG. 7 is a view illustrating a structure for connecting an engine to a hybrid transmission according to a fourth exemplary embodiment of the present invention.

FIG. 7 is a view illustrating the structure for connecting an engine to a hybrid transmission according to the fourth exemplary embodiment of the present invention.

Except for the connecting unit and components for assembling the rotor shaft corresponding to the connecting unit, the fourth exemplary embodiment of the present invention is identical to the first exemplary embodiment.

In the fourth exemplary embodiment of the present invention, the connecting unit is a connecting nut 14. The connecting nut 14 is connected to an outer diameter of the rotor shaft 51 by means of the splines S.

The bolt B is coupled to the opposite surface of the rotor shaft 51, which is directed toward the crank shaft 60, in the state in which the connecting nut 14 is coupled to the rotor shaft 51. During the assembly process, the surface of the rotor shaft 51 directed toward the crank shaft 60 and the surface the connecting nut 14 directed toward the crank shaft 60 of form the same plane.

During a process of coupling the bolt B, the locking plate L2 coupled to the bolt B is inserted into a second insertion portion 141 provided on the opposite surface of the connecting nut 14.

Specifically, the locking plate L2 is inserted into the second insertion portion 141 and is in close contact with the opposite surfaces of the connecting nut 14 and the rotor shaft, such that the connecting nut 14 is in a locked state in which the connecting nut 14 cannot be separated from the rotor shaft 51.

As described above, the structure according to the present invention may connect the rotor of the hybrid transmission and the connecting shaft of the engine without a gap. In addition, the structure according to the present invention may prevent rattling noise by eliminating gaps between the surface of the teeth of the connecting shaft of the engine.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A structure for connecting an engine to a hybrid transmission, the structure comprising:
   a connecting unit connected to a rotor shaft located at an opposite side of the connecting unit, the connecting unit having an edge portion connected to a mass body by a connecting plate; and
   a drive plate positioned at a side close to a crank shaft so as to be placed opposite to the connecting unit, the drive plate being configured to connect the mass body to the crank shaft,
   wherein the connecting unit is a flange, and one surface of the flange is connected to one surface of the rotor shaft,
   wherein a bolt hole is formed in one surface of the flange along a pitch circle that forms a concentric circle with a center of one surface of the flange, and
   wherein the flange is connected to the rotor shaft by a bolt coupled to the bolt hole.

2. The structure of claim 1, wherein splines are formed on one surface of the flange at a periphery of the bolt hole.

3. The structure of claim 2, wherein splines corresponding to the splines of the flange are provided formed on one surface of the rotor shaft.

4. A structure for connecting an engine to a hybrid transmission, the structure comprising:
   a connecting unit connected to a rotor shaft located at an opposite side of the connecting unit, the connecting unit having an edge portion connected to a mass body by a connecting plate; and
   a drive plate positioned at a side close to a crank shaft so as to be placed opposite to the connecting unit, the drive plate being configured to connect the mass body to the crank shaft,
   wherein the connecting unit is a flange, and one surface of the flange is connected to one surface of the rotor shaft, and
   wherein the crank shaft is connected to a boss located at a center of the drive plate by a first bolt, and an edge portion of the drive plate is connected to the mass body a second bolt.

5. A structure for connecting an engine to a hybrid transmission, the structure comprising:
   a connecting unit connected to a rotor shaft located at an opposite side of the connecting unit, the connecting unit having an edge portion connected to a mass body by a connecting plate; and
   a drive plate positioned at a side close to a crank shaft so as to be placed opposite to the connecting unit, the drive plate being configured to connect the mass body to the crank shaft,
   wherein a housing partition wall is positioned between a motor and the mass body, and between the motor and the connecting plate,
   wherein a hub is positioned at a center of the housing partition wall so as to surround the rotor shaft, and
   wherein an oil seal for providing fluid tightness is positioned between an outer diameter of the rotor shaft and an inner diameter of the hub.

6. The structure of claim 1, wherein the connecting unit is a first connecting shaft, wherein the first connecting shaft comprises:
a first extension portion connected to the rotor shaft by means of splines while penetrating an inside of the rotor shaft; and
a second extension portion extending in a direction from the first extension portion to the crank shaft to be inserted into the crank shaft, and
wherein a locking nut is thread-coupled to an exposed portion of the first extension portion which passes the inside of the rotor shaft and is exposed to an outside of the rotor shaft, and the locking nut is in close contact with an opposite surface of the rotor shaft,
such that the first connecting shaft is locked.

7. The structure of claim 5, wherein the connecting unit is a second connecting shaft,
wherein the second connecting shaft is configured to be inserted into the rotor shaft and connected to the rotor shaft by means of splines,
wherein a bolt is thread coupled to an end surface of the second connecting shaft, and a locking plate is coupled to the bolt and is configured to be inserted into a first insertion portion formed on an opposite surface of the rotor shaft to simultaneously come into close contact with opposite surfaces of the rotor shaft and the second connecting shaft, such that the second connecting shaft is locked, and
wherein an O-ring is pressed against the locking plate to provide fluid tightness on a portion where an end surface of the rotor shaft is connected to the end surface of the second connecting shaft means of the splines.

8. The structure of claim 5, wherein the connecting unit is a connecting nut,
wherein the connecting nut is connected to an outer diameter of the rotor shaft by means of splines, and
wherein when a bolt is coupled to an opposite surface of the rotor shaft, the locking plate coupled to the bolt is inserted into a second insertion portion formed on an opposite surface of the connecting nut, and the rotor shaft and the opposite surface of the connecting nut simultaneously come into close contact with each other, such that the connecting nut is locked.

* * * * *